United States Patent [19]
Ogino

[11] Patent Number: 5,291,335
[45] Date of Patent: Mar. 1, 1994

[54] OPTICAL EQUIPMENT HAVING A LENS POSITION DETECTOR

[75] Inventor: Shigeru Ogino, Tokyo, Japan

[73] Assignee: Canon Kabushiki Kaisha, Tokyo, Japan

[21] Appl. No.: 801,459

[22] Filed: Dec. 2, 1991

[30] Foreign Application Priority Data

Dec. 7, 1990 [JP] Japan .................................. 2-400823

[51] Int. Cl.⁵ ........................... G02B 15/14; G02B 7/02
[52] U.S. Cl. .................................... 359/696; 359/694; 359/823
[58] Field of Search ........ 359/819, 827, 814, 694–698, 359/819, 823–830; 354/195.1–195.12, 202; 358/209, 225, 227

[56] References Cited

U.S. PATENT DOCUMENTS

| 4,534,624 | 8/1985 | Toda et al. | 359/823 |
| 4,785,210 | 11/1988 | Maruyama et al. | 359/696 |

FOREIGN PATENT DOCUMENTS

| 168406 | 9/1984 | Japan | 359/824 |
| 83007 | 5/1985 | Japan | 359/823 |
| 146211 | 8/1985 | Japan | 359/824 |
| 102212 | 5/1987 | Japan | 359/824 |

Primary Examiner—Bruce Y. Arnold
Assistant Examiner—Thong Nguyen
Attorney, Agent, or Firm—Robin, Blecker, Daley & Driscoll

[57] ABSTRACT

An optical equipment is equipped with a compact and high precision lens position detector which has a lens holder guide member which is made of a conductor and is provided with a detection electrode for detecting the position of the lens holder by a change in an electrical capacitance.

10 Claims, 2 Drawing Sheets

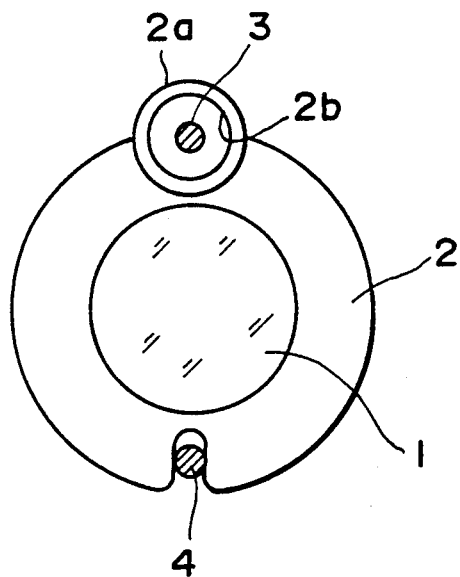
F I G. 2
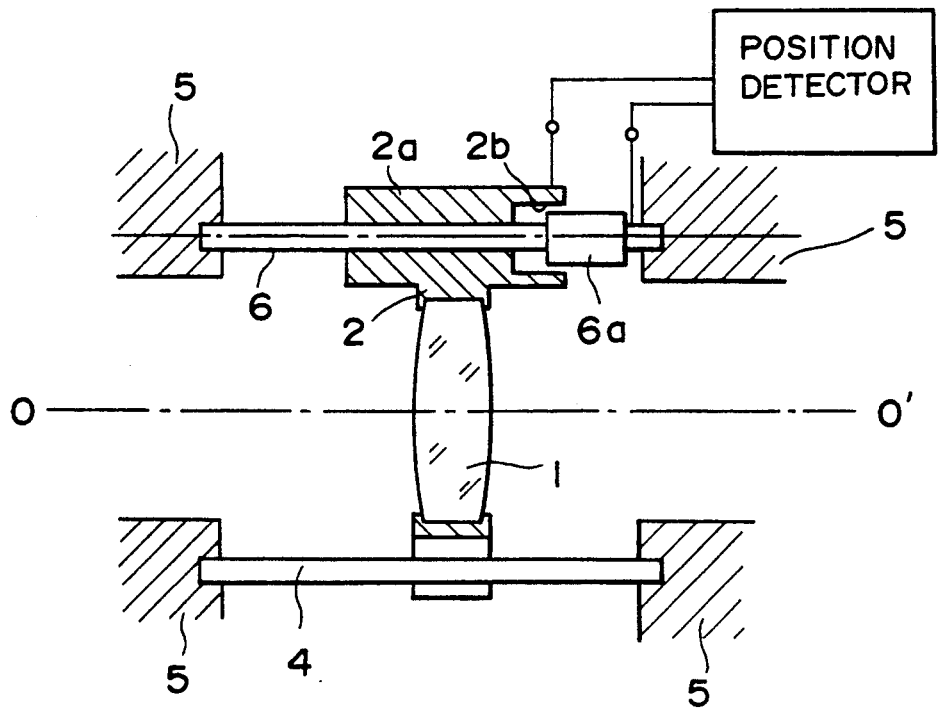
F I G. 3

OPTICAL EQUIPMENT HAVING A LENS POSITION DETECTOR

BACKGROUND OF THE INVENTION

1. Field of the Invention

The present invention relates to optical equipment having a lens position detector.

2. Related Background Art

In a prior art lens position detector in a video camera, a light from a light emitting diode is irradiated to a detection pattern formed on a lens barrel (for example, a Gray code pattern formed on a substrate) and a reflected light is detected by a photo-transistor to read the detection pattern to produce position information, or a so-called noncontact frequency generator is used. For example, a rotation speed of a motor is optically detected by providing a pulse disk on the motor in accordance with the principle described above.

However, in the prior art Gray code system, it is necessary to increase the number of bits of the Gray code when high precision and resolution are required in the lens position detection. As a result, the size of the detector increases. Further, there is a limit in reducing the pattern size of the Gray code. The frequency generator system is effective to a DC motor having a reduction gear mechanism (which is used at a high rotation speed) but it is not suitable to a direct lens drive system without a reduction gear mechanism.

SUMMARY OF THE INVENTION

It is an object of the present invention to provide an optical equipment having a compact and high precision lens position detector which has a lens holder guide member which is made of a conductor and is provided with a detection electrode for detecting the position of the lens holder by a change in an electrical capacitance.

BRIEF DESCRIPTION OF THE DRAWINGS

FIG. 2 shows a front view as viewed from the right side of FIG. 1; and

FIG. 3 shows a sectional view of the second embodiment of the present invention.

DETAILED DESCRIPTION OF THE PREFERRED EMBODIMENTS

Figure 1:
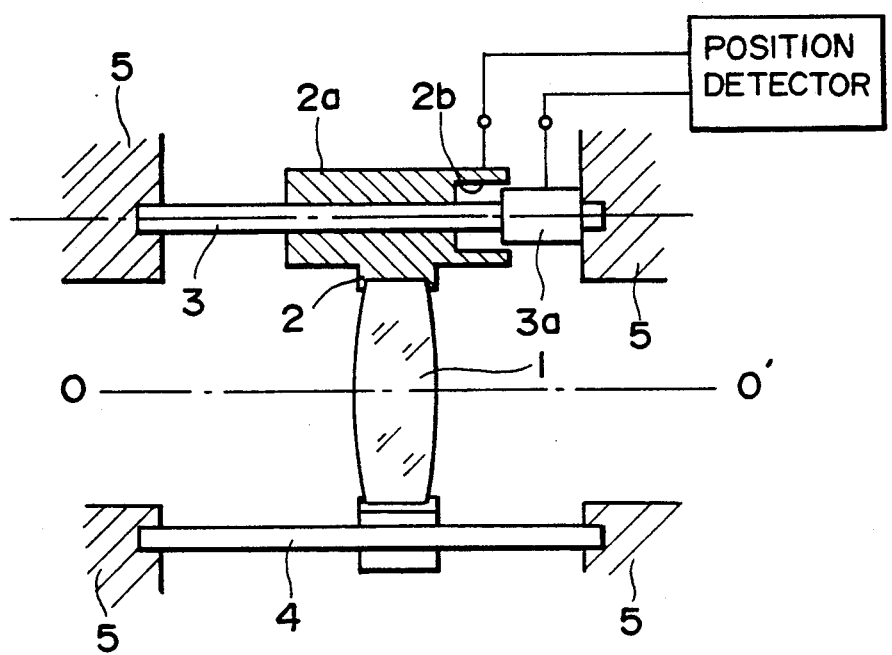
FIG. 1 shows a sectional view of the first embodiment of the present invention.

An embodiment of the present invention is now explained with reference to the attached drawings. FIG. 1 shows a sectional view of a first embodiment of the present invention. Numeral 1 denotes a lens, numeral 2 denotes a lens holder for holding and securing the lens 1, and numerals 3 and 4 denote guide bars for slidably guiding and supporting the lens holder 2 in a direction O-O' of the optical axis. The guide bars 3 and 4 are held by a lens barrel 5. The lens holder 2 is guided and supported in the direction of the optical axis by the guide bars 3 and 4. The lens is directly driven without a reduction gear mechanism. The driving source may be an electromagnetic motor such as a voice coil motor or a solid-state device such as a piezo-electric element. It is not specified in the present invention and the explanation thereof is omitted.

FIG. 2 shows a front view of the lens holder 2. It has an electrode 2b arranged coaxially to the guide bar 3 in a sliding area 2a for the guide bar 3. These are integrally formed The guide bar 3 is a shaft of bar shape having a step or portion 3a which faces the electrode 2b of the lens holder 2 on the concentric circle, as shown in FIG. 1. The lens holder 2 is substantially cylindrical shape and its diameter is larger than the largest diameter of the guide bar 3 and its step 3a. In this manner, a variable electric capacitance type position detector having the electrode 2b and the guide bar 3 as the conductor is constructed. A principle of detection is going to be explained below.

The guide bar 3 and the electrode 2b are arranged concentrically cocentrically and form an electrical capacitance C therebetween. Since the guide bar 3 is the shaft having the step 3a, the distance between the electrodes and a ratio thereof change with the position of the lens holder 2, and the electrical capacitance C changes accordingly. The ratio is the ratio of the distance from the inner wall of the sliding area 2a to the front of the step 3a and the distance from the front of the step 3a to the end of the electrode 2b. The change of C is utilized as lens position information. The change of the electrical capacitance C is detected by a known AC method which includes a bridge method and a resonance method. In the bridge method, the electrical capacitance C is measured by detecting an unbalanced voltage of an impedance bridge. A phase sensitivity detection system is known as a high sensitivity method to detect the unbalance in the bridge. In the resonance method, a resonance circuit is formed by the electrical capacitance C and a known inductance L and C is determined from a resonance frequency f in accordance with an equation $f = \frac{1}{2}\pi\sqrt{LC}$. In the present embodiment, either the bridge method or the resonance method may be used, and the explanation thereof is omitted.

In this manner, the lens position information is detected by the change of the electrical capacitance C.

A second embodiment of the present invention is now going to be explained. FIG. 3 shows a sectional view of the second embodiment. The lens 1, the lens holder 2, the guide bar 4 and the lens barrel 5 are identical to those of the first embodiment. The guide bar 6 is of bar shape and is a conductive electrode by itself and formed integrally with a cylindrical dielectric member 6a. The dielectric member 6a may be made of silicone rubber having a large specific dielectric constant, and it is formed integrally with the guide bar 6 by coating or fitting. The lens holder 2 is slidably guided and supported by the guide bars 4 and 6 in the direction of the optical axis. The drive source is identical to that of the first embodiment. A principle of detection is now explained. The electrode 2b which is of substantially cylindrical shape and of larger diameter than the largest diameter of the dielectric member 6a, and the guide bar 6 form an electrical capacitance C therebetween. When the lens holder 2 is moved rightward in FIG. 3, the dielectric member 6a is inserted between the electrodes and the electrical capacitance C changes. The change of the electrical capacitance C is used as the lens position information. The method for detecting the change of the electrical capacitance C is the same as that of the first embodiment.

In this manner, the size reduction and the high precision of the apparatus are attained by sharing the lens holder 2 and the guide bar 6 with the electrodes.

In accordance with the present embodiment, the electrode on the guide bar and the electrode on the lens holder function as the electrodes of the capacitor and the position of the lens holder is detected by the change of the electrical capacitance. Accordingly, the rotary detector is not required and the compact and high precision lens position detector is provided.

What is claimed is:

1. An optical equipment having a lens position detector, comprising:
   a) a lens holder for holding a lens;
   b) a guide member for slidably supporting the lens holder along an optical axis; and
   c) electrical displacement detection means for detecting a position of said lens holder with respect to said guide member by an electrical output, said electrical displacement detection means detecting the position of said lens holder by detecting a change of an electrical capacitance of a capacitor constituted by an electrode formed on at least a part of said guide member and an electrode of conductive member formed on at least a part of said lens holder.

2. An optical equipment according to claim 1, wherein said electrical displacement detection means detects a relative position of said lens holder to said guide member by detecting the change of the electrical capacitance of the capacitor constituted by the electrode formed at least on a part of said guide member, a dielectric member formed on at least a part of said guide member, and an electrode of a conductive member formed at least on a part of said lens holder.

3. An optical equipment according to claim 2, wherein said guide member is of a bar shape and has a dielectric portion whose diameter is smaller than the diameter of a portion for holding said lens holder, and said lens holder has a conductive portion having a substantially cylindrical shape whose diameter is larger than the largest diameter part of said dielectric portion of said guide member.

4. An optical equipment according to claim 3, wherein at least a part of said guide member is the conductive electrode.

5. An optical equipment according to claim 1, wherein said guide member is of a bar shape and has a conductive portion whose diameter is smaller than the diameter of a portion for holding said lens holder, and said lens holder has a conductive portion having a substantially cylindrical shape whose diameter is larger than the largest diameter part of said conductive portion of said guide member.

6. An optical equipment having a position detector, comprising:
   a) a guide bar;
   b) a movable member movably supported by said guide bar along an optical axis; and
   c) electrical displacement detection means for detecting a position of said movable member by an electrical output, said electrical displacement detection means detecting the position of said movable member by detecting a change of an electrical capacitance of a capacitor constituted by an electrode formed on at least a part of said guide bar and an electrode of a conductive member formed on at least a part of said movable member.

7. An optical equipment according to claim 6, wherein said electrical displacement detection means detects a position of said movable member by detecting the change of the electrical capacitance of the capacitor constituted by an electrode formed at least on a part of said guide member, a dielectric member formed on at least a part of said guide member, and an electrode of a conductive member formed at least on said lens holder.

8. An optical equipment according to claim 7, wherein said guide bar has at least one dielectric portion whose diameter is smaller than the diameter of a portion for holding said movable member, and said lens holder has a conductive portion having a substantially cylindrical shape whose diameter is larger than the largest diameter part of said dielectric portion.

9. An optical equipment according to claim 8, wherein at least a part of said guide bar is the conductive electrode.

10. An optical equipment according to claim 6, wherein said guide bar has at least one conductive portion whose diameter is smaller than the diameter of a portion for holding said movable member, and said movable member has a conductive portion having a substantially cylindrical shape whose diameter is larger than the largest diameter part of said conductive portion of said guide member.

* * * * *

UNITED STATES PATENT AND TRADEMARK OFFICE
CERTIFICATE OF CORRECTION

PATENT NO. : 5,291,335
DATED : March 1, 1994
INVENTOR(S) : Shigeru Ogino

It is certified that error appears in the above-indentified patent and that said Letters Patent is hereby corrected as shown below:

Col. 2, line 1, after "3a" insert -- of a larger diameter than the remainder of the shaft bar --.

Col. 2, line 11, delete "cocentrically" (second occurrence)

Col. 2, line 44, after "6a" insert -- which is of a larger diameter than the remainder of the guide bar --.

Signed and Sealed this

Sixteenth Day of August, 1994

Attest:

BRUCE LEHMAN

Attesting Officer

Commissioner of Patents and Trademarks